(12) United States Patent
Barnum

(10) Patent No.: US 11,583,059 B2
(45) Date of Patent: Feb. 21, 2023

(54) ATTACHMENT DEVICE FOR PERSONAL ELECTRONIC DEVICE

(71) Applicant: Andrew Barnum, Rocklin, CA (US)

(72) Inventor: Andrew Barnum, Rocklin, CA (US)

( * ) Notice: Subject to any disclaimer, the term of this patent is extended or adjusted under 35 U.S.C. 154(b) by 88 days.

(21) Appl. No.: 16/837,439

(22) Filed: Apr. 1, 2020

(65) Prior Publication Data

US 2020/0315331 A1 Oct. 8, 2020

Related U.S. Application Data

(60) Provisional application No. 62/828,092, filed on Apr. 2, 2019.

(51) Int. Cl.
| | | |
|---|---|---|
| *F16M 11/00* | (2006.01) | |
| *A45F 5/02* | (2006.01) | |
| *H01F 7/02* | (2006.01) | |
| *F16M 13/04* | (2006.01) | |
| *F16M 13/00* | (2006.01) | |
| *F16M 13/02* | (2006.01) | |
| *G06F 1/16* | (2006.01) | |

(52) U.S. Cl.
CPC .............. *A45F 5/02* (2013.01); *F16M 13/005* (2013.01); *F16M 13/022* (2013.01); *F16M 13/04* (2013.01); *G06F 1/1656* (2013.01); *H01F 7/0252* (2013.01); *A45F 2200/0516* (2013.01)

(58) Field of Classification Search
CPC . A45F 5/02; A45F 2200/0516; F16M 13/005; F16M 13/04; F16M 13/022; H01F 7/0252; G06F 1/1656
USPC .................. 248/683, 206.5, 309.4; 455/575.1
See application file for complete search history.

(56) References Cited

U.S. PATENT DOCUMENTS

| 9,894,192 | B2 * | 2/2018 | Cox, III | G06F 1/1656 |
| 10,237,384 | B2 * | 3/2019 | Holder | B60R 11/0241 |
| 10,484,522 | B1 * | 11/2019 | McHatet | H04B 1/3888 |
| 10,886,771 | B2 * | 1/2021 | Kasar | H02J 7/0042 |
| 11,162,633 | B2 * | 11/2021 | Sullivan | F16M 13/022 |
| 11,169,619 | B2 * | 11/2021 | Kim | G06F 3/0202 |

* cited by examiner

*Primary Examiner* — Todd M Epps
(74) *Attorney, Agent, or Firm* — Gutwein Law; Greg N. Geiser

(57) ABSTRACT

An attachment device for a personal electronic device is provided in a pair of cooperating plates with a first plate, hereinafter referred to as an outer plate, of the pair of cooperating plates being affixed to the personal electronic device and a second plate, hereinafter referred to as an inner plate, of the pair of cooperating plates configured for removable adhering to the outer plate via a magnetic coupling. Accordingly, the outer plate and the inner plate are sided to enable the cooperative features of the device.

18 Claims, 6 Drawing Sheets

ATTACHMENT DEVICE FOR PERSONAL ELECTRONIC DEVICE

CROSS REFERENCE TO RELATED APPLICATIONS

This application claims priority to U.S. Provisional Patent Application No. 62/828,092 filed 2 Apr. 2019 to the above-named inventor and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention generally provides an accessory configured to attach a personal electronic device, such as a mobile phone, to a surface, such as a fabric or clothing. More particularly, the invention relates to a cooperative assembly comprised of a pair of cooperating plates with one plate of the pair of cooperating plates configured for securing to a device for removable attachment together with a second plate to secure the device to a surface.

BACKGROUND

Within today's world one of the most common items found on any one person is a personal electronic device, such as a mobile phone. This personal electronic device is often used for a variety of tasks, including, but not limited to, communication, photography, Internet access, social media, tele/video conferencing, and entertainment. As this personal electronic device has become so prevalent, users of these devices are continually searching for new and improved ways for storing and securing these devices on their person.

One such solution is the use of a case having a clip or holster for the personal electronic device. These clips or holsters, as they are sometimes called, are useful, but do have several disadvantages. First, they generally restrain the device to a belt or waistline region of user. Second, they are generally utilized to restrain the device while the device is not in use and generally are not configured to enable use of the device whilst the device is restrained. Third, these devices may position the device in an uncomfortable position when the wearer is in a seated position.

Yet another solution is an elastic type holder constructed of extensible materials. Typically, these holders are generally described as arm bands or bands and generally include an adjustable strap member coupled to pocket sized to receive the personal electronic device. This pocket usually includes a transparent window enabling a user to view the screen of the device and otherwise operate the device through this transparent window. These elastic type holders, although useful, have several disadvantages. First, it is difficult to place the devices into and out of the holder during use. Second, the transparent window tends to distort images on the phone and makes the device difficult to use.

Still yet another alternate solution, is for users to place the personal electronic device into a pocket within a clothing item. However, this solution has several disadvantages as well. First, the user may not be wearing clothes a pocket large enough or convenient enough for securing the device. Second, if a pocket is present within the clothing item, this pocket may be too small for the device is placed in an uncomfortable position and does not provide adequate storage while the device is in use.

Therefore, there is a need within the marketplace for an improved solution for holding a personal electronic device during use and when not in use. Preferably this solution is useful for any type and style of device, is applicable for attachment to any type of clothing, and is configured to support the device while it is in use.

SUMMARY OF THE INVENTION

The device of the present disclosure most generally provides a holder that is configured for attachment to a personal electronic device. The device is provided in a universal assembly that is applicable for attachment to several styles and types of personal electronic devices. Throughout this specification the term personal electronic device is utilized to refer to any type of portable electronic device, including, but not limited to mobile phones, tablets, and personal gaming devices.

The device of the present disclosure is provided in a pair of cooperating plates with a first plate, hereinafter referred to as an outer plate, of the pair of cooperating plates being affixed to the personal electronic device and a second plate, hereinafter referred to as an inner plate, of the pair of cooperating plates configured for removable adhering to the outer plate. Accordingly, the outer plate and the inner plate are sided to enable the cooperative features of the device.

The outer plate having a first side and second side opposed the first side. The first side configured for attachment to a personal electronic device through the use of adhesive substance. The adhesive substance provided for superior adhesion, durability, and reuse. The second side of the outer plate configured for the cooperative receipt of a first side of the inner plate. The second side of the outer plate having a magnet incased within an interior, the magnet within the outer plate directionally orientated towards the exterior of the second side of the outer plate opposite the first side and having a first polarity. The directional orientation of the magnet configured to shield the personal electronic device from the magnetic field generated by the magnet. The second side of the outer plate further having a raised edge extending around a perimeter of the outer plate to aid the user in aligning the inner plate with the outer plate in the cooperative assembly. The raised edge helps to ensure a proper fitment of the inner plate into the outer plate.

The inner plate having the first side and a second side opposite the first side. The first side having a magnet within an interior, the magnet within the inner plate directionally orientated towards an exterior of the first side of the inner plate opposite the second side with the magnet having a second polarity, the second plurality selected for coupling with the first polarity of the outer plate, wherein the polarities are opposite to ensure an attractive connection between the cooperative outer and inner plates. The second side of the inner plate having an exterior surface. The exterior surface of the second side having a texture, the texture configured to providing a gripping surface to enable comfortable and easy holding by the user.

In use of the device, the user will first adhere the outer plate to the personal electronic device by placing the first side in an adhesive coupling with the personal electronic device. The user will then utilize the inner plate in a coupling with the outer plate to adhere the personal electronic device to an article of clothing by placing the personal electronic device with installed outer plate on a first side of the clothing and placing the inner plate in a magnetic coupling with the outer plate on a second side of the clothing, wherein the clothing is sandwiched between the outer plate and the inner plate and supported. When not adhered to clothing, the inner plate can be placed in a coupling with the outer plate and stored until it is needed.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with the accompanying drawings, and wherein.

DETAILED DESCRIPTION OF THE INVENTION

Figure 1:
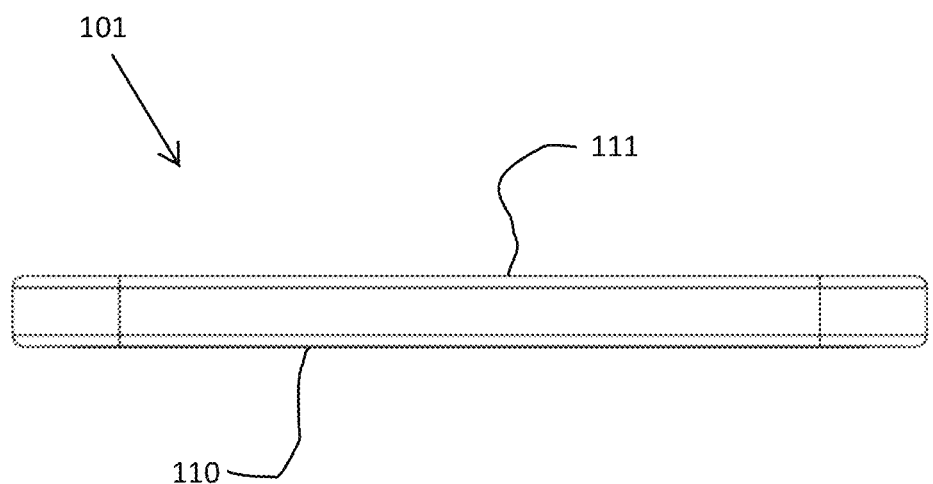
FIG. 1 is a side view of the outer plate, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS., with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Such joining may allow for the transfer of fluids, gasses, and plasma or the flow of electricity or electrical signals.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Figure 2:
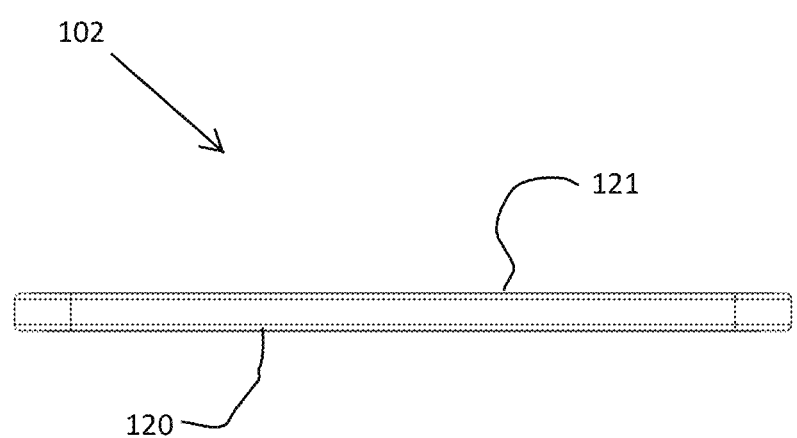
FIG. 2 is a side view of the inner plate, according to the present disclosure.
Figure 3:
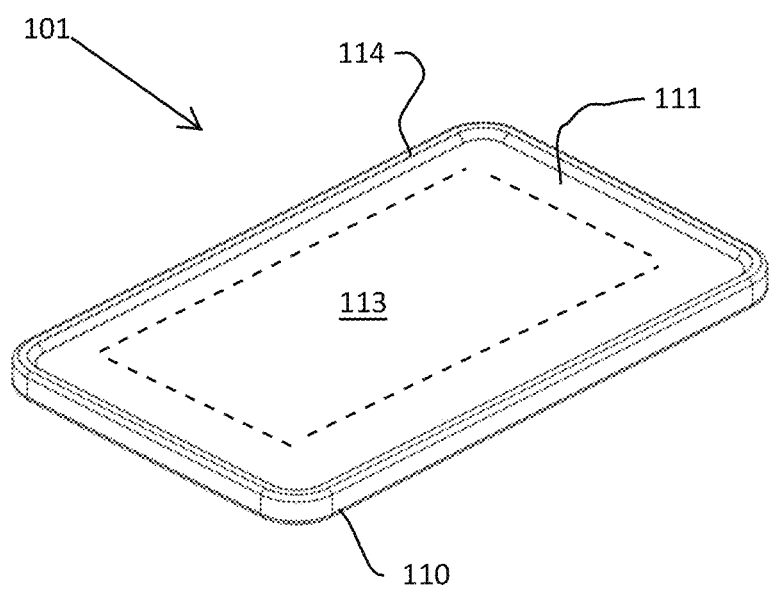
FIG. 3 is an isometric view of the outer plate, according to the present disclosure.
Figure 4:
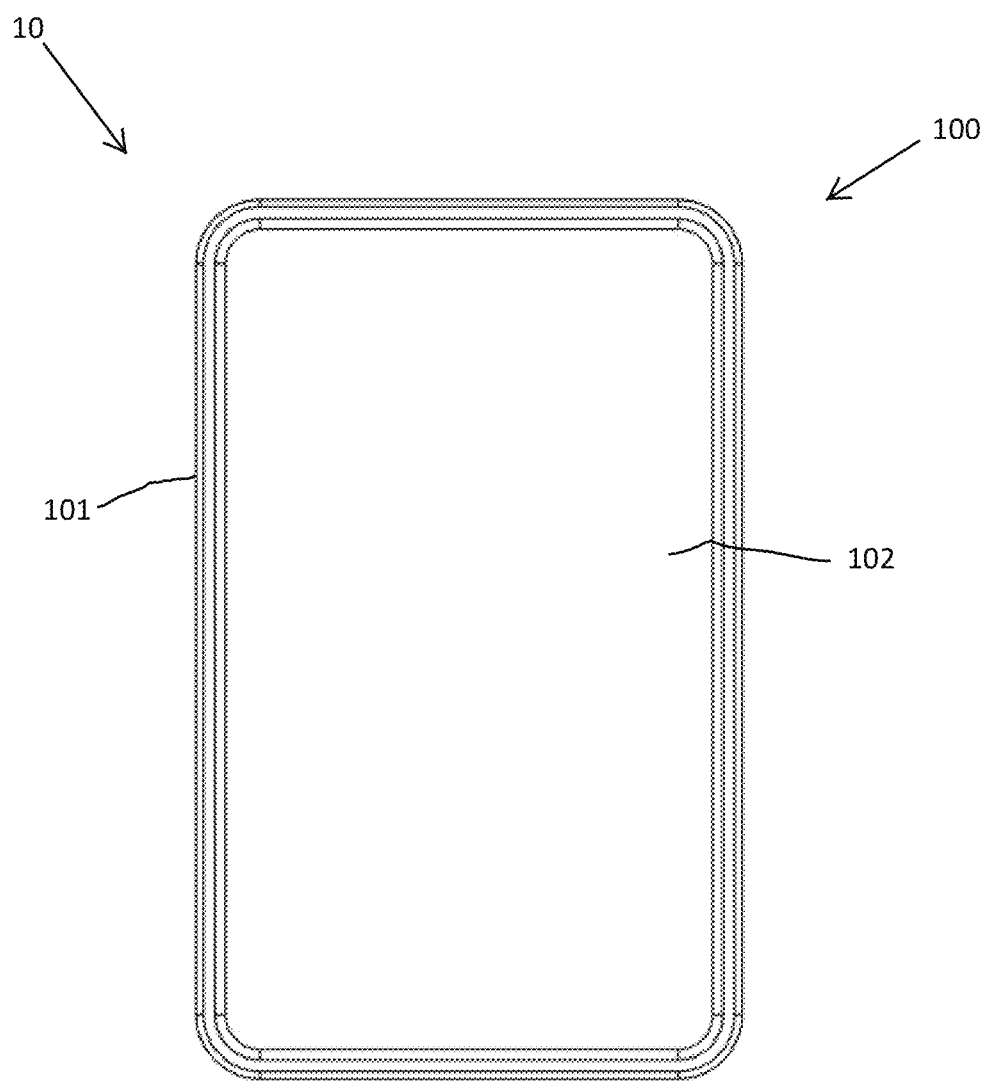
FIG. 4 is a top side view of the inner plate coupled to the outer plate, according to the present disclosure.
Figure 5:
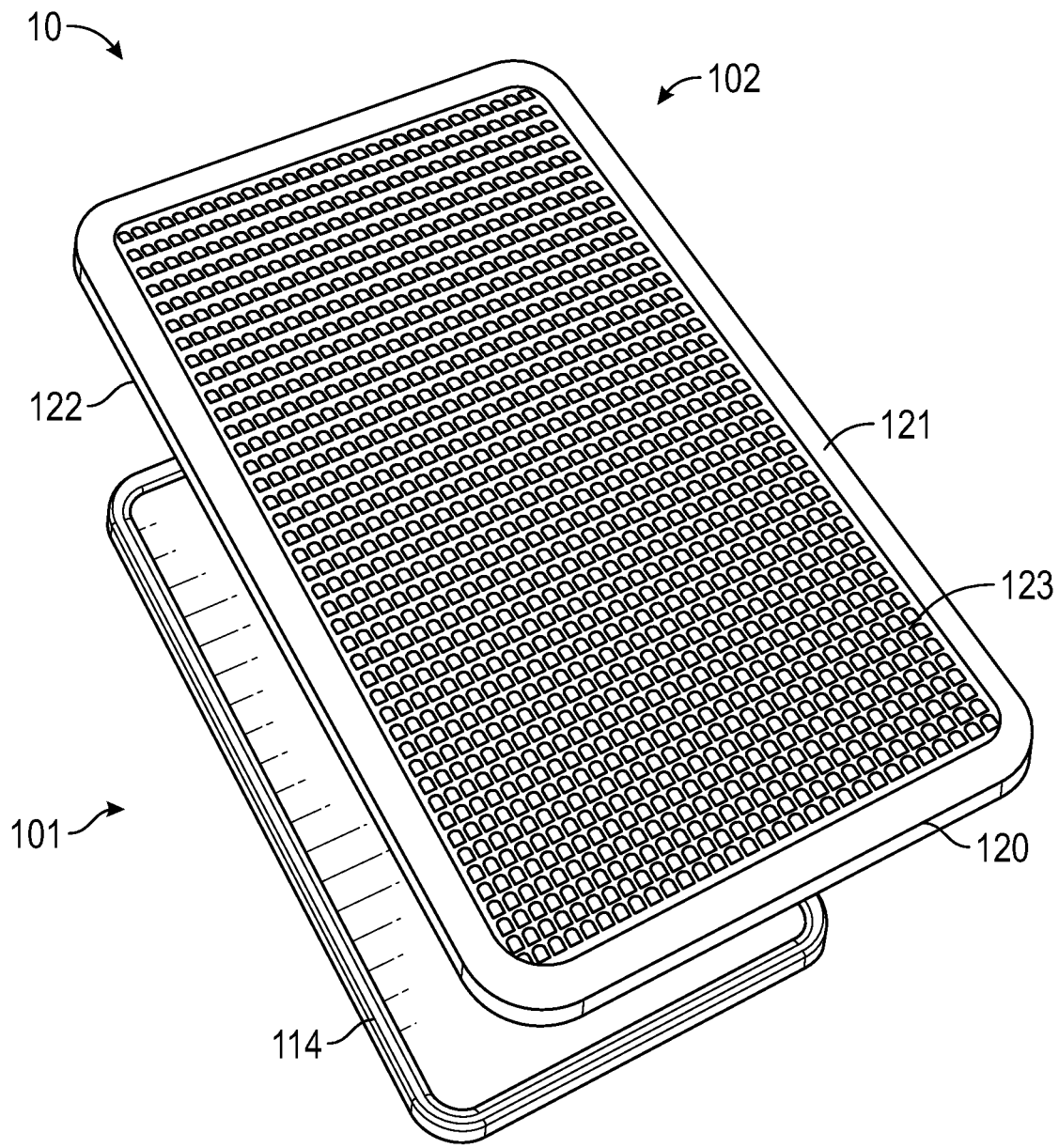
FIG. 5 is an exploded view of the outer plate and the inner plate separated, according to the present disclosure.
Figure 6:
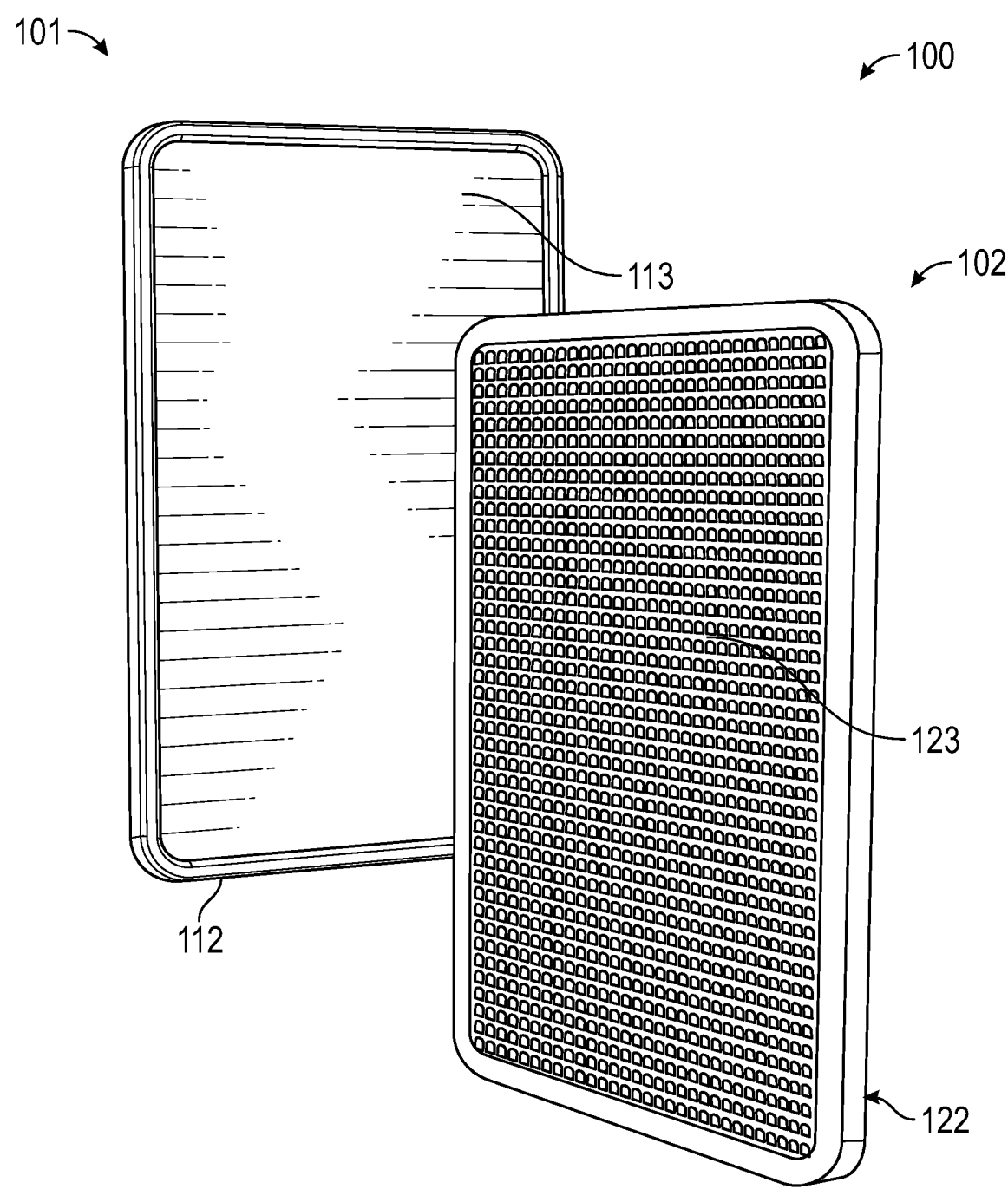
FIG. 6 is an isometric view of the cooperating plates separated, according to the present disclosure.

Referring to the figures, FIGS. 1-6 show the attachment device for a personal electronic device, generally referred to as device 10. The device 10 is most generally configured as an accessory to aide a user in the holding and securing of a personal electronic onto their person or a surface. Accordingly, the device 10 is particularly useful in providing an attachment accessory for mobile phones.

The device 10 of the present disclosure is provided in a pair of cooperating plates 100 with a first plate 101, hereinafter referred to as an outer plate 101, of the pair of cooperating plates 100 being affixed to the personal electronic device and a second plate 102, hereinafter referred to as an inner plate 102, of the pair of cooperating plates 100 configured for removable adhering to the outer plate 101. Accordingly, the outer plate 101 and the inner plate 102 are sided to enable the cooperative features of the device 10.

The outer plate 101 having a first side 110 and second side 111 opposed the first side 110. The first side 110 configured for attachment to the personal electronic device through the use of adhesive 112 substance. The adhesive 112 provided for superior adhesion, durability, and reuse. In the preferred embodiment, the adhesive 112 is capable of reuse and cleaning. The second side 111 of the outer plate 101 configured for the cooperative receipt of a first side 120 of the inner plate 102. The second side 111 of the outer plate 101 having a first magnet 113 incased within an interior space, the first magnet 113 within the outer plate 101 directionally orientated towards an exterior of the second side 111 of the outer plate 101 opposite the first side 110 and having a first polarity.

The directional orientation of the first magnet 113 configured to shield the personal electronic device from the magnetic field generated by the first magnet 113. The second side 111 of the outer plate 101 further having a raised edge 114 extending around a perimeter of the outer plate 101 to aid the user in aligning the inner plate 102 with the outer plate 101 in the cooperative assembly. The raised edge 114 helps to ensure a proper fitment of the inner plate 102 into the outer plate 101.

The inner plate 102 having the first side 120 and a second side 121 opposite the first side 120. The first side 120 having a second magnet 122 within an interior space, the second magnet 122 within the inner plate 102 directionally orientated towards an exterior of the first 120 side of the inner plate 102 opposite the second side 121 with the second magnet 122 having a second polarity. The second plurality of the second magnet 122 selected for coupling with the first polarity of the outer plate 101, wherein the first polarity and the second polarity are opposite to ensure an attractive magnetic connection between the first magnet 113 and the second magnet 122 of the cooperative outer plate 101 and the inner plate 102. The second side 121 of the inner plate 102 having a textured exterior surface 123. The textured exterior surface 123 of the second side 121 configured to providing a gripping surface to enable comfortable and easy holding of the device 10 by the user. Further the textured exterior surface 123 providing an additional friction to the second side 121 when placed on an interior surface of a fabric or on interior of a pocket, such as, but not limited to a shirt pocket, wherein this textured exterior surface 123 helps to secure the device 10 when placed.

In the preferred embodiment, the device 10 textured exterior surface 123 of the second side 121 is provided in a rubber or rubber-like coating to aid in gripping and increase friction.

In use of the device 10, the user will first adhere the outer plate 101 to the personal electronic device by placing the first side 110 in an adhesive coupling with the personal electronic device. The user will then utilize the inner plate 102 in a coupling with the outer plate 101 to adhere the personal electronic device to a surface, such as, but not limited to, an article of clothing by placing the personal electronic device with the installed outer plate 101 on a first side of the surface and placing the inner plate 102 in a magnetic coupling with the outer plate 101 on a second side of the surface, wherein the surface is sandwiched between the outer plate 101 and the inner plate 102 supporting the device 10. When not adhered to a surface, the device 10 the inner plate 102 can be placed in a coupling with the outer plate 101 and stored until it is needed. The raised edges 114 of the second side 111 of the outer plate 101 helps to ensure alignment of inner plate 102. Accordingly and preferably, the inner plate 102 having a perimeter size that is selected to correspond to the size of the perimeter of a cavity formed within the raised edges 114, wherein the inner plate 102 has a size slightly smaller than the outer plate 101.

In the depicted and preferred embodiments of the device 10, the device 10 is provided with a rectangular shape generally selected to correspond to the shape of the personal electronic device the device 10 is place upon. However, the rectangular shape of the device 10 is only a preference and the device 10 structural components can be adapted to any size and shape with departing substantially from the provided description.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. An attachment device for a personal electronic device, the attachment device comprising:
   a pair of cooperative plates, the cooperative plates configured for a removable coupling to each plate of the pair of cooperative plates, the pair of cooperative plates comprising:
   an outer plate, the outer plate having a first side with an adhesive configured for coupling to the personal electronic device, a second side opposite the first side, and a first magnet, the first magnet directionally orientated towards the second side opposite the first side and shielded from the personal electronic device, the first magnet having a first polarity; and
   an inner plate, the inner plate having a first side, a second side, and a second magnet, the second magnet directionally orientated towards the first side opposite the second side, the second magnet having a second polarity, wherein the first polarity and the second polarity are opposite to ensure an attractive magnetic connection between the first magnet and the second magnet, wherein a magnetic field of the attachment device is shielded from interference with the personal electronic device.

2. The attachment device as in claim 1, wherein the outer plate second side includes a raised edge, the raised edge extending a perimeter of the second side defining an area.

3. The attachment device as in claim 2, wherein the inner plate is sized for receipt within the area of the outer plate.

4. The attachment device as in claim 1, wherein the inner plate second side includes a textured exterior surface.

5. The attachment device as in claim 4, wherein the textured exterior surface comprises rubber like material.

6. The attachment device as in claim 1, wherein the adhesive is a reusable adhesive.

7. An attachment device for a personal electronic device, the attachment device configured to enable the securing of the personal electronic device to a surface having opposed sides, the attachment device comprising:
   an outer plate, the outer plate comprising:
      a first side, the first side having an adhesive configured for coupling to the personal electronic device;
      a second side, the second side opposite the first side; and
      a first magnet, the first magnet directionally orientated towards the second side opposite the first side and shielded from the personal electronic device, the first magnet having a first polarity; and
   an inner plate, the inner plate configured for a removable coupling to the outer plate on the opposed side of the surface from the outer plate, the inner plate comprising:
      a first side;
      a second side; and
      a second magnet, the second magnet directionally orientated towards the first side opposite the second side, the second magnet having a second polarity, wherein the first polarity of the outer plate and the second polarity of the inner plate are opposite to ensure an attractive magnetic connection between the first magnet and the second magnet on the opposed sides of the surface, wherein a magnetic field of the attachment device is shielded from interference with the personal electronic device.

8. The attachment device as in claim 7, wherein the outer plate second side includes a raised edge, the raised edge extending a perimeter of the second side defining an area.

9. The attachment device as in claim 8, wherein the inner plate is sized for receipt within the area of the outer plate.

10. The attachment device as in claim 7, wherein the inner plate second side includes a textured exterior surface.

11. The attachment device as in claim 10, wherein the textured exterior surface comprises rubber like material.

12. The attachment device as in claim 7, wherein the adhesive is a reusable adhesive.

13. An attachment device for a personal electronic device, the attachment device configured to enable the securing of the personal electronic device to an article of clothing having an inner side and an outer side, the attachment device comprising:
   an outer plate, the outer plate configured for placement on the outer side, the outer plate comprising:
      a first side, the first side having an adhesive configured for coupling to the personal electronic device;
      a second side, the second side opposite the first side; and
      a first magnet, the first magnet directionally orientated towards the second side opposite the first side, the first magnet having a first polarity and shielded from the personal electronic device; and
   an inner plate, the inner plate configured for a removable coupling to the outer plate, the inner plate positioned on the inner side opposite the outer plate, the inner plate comprising:
      a first side;
      a second side; and
      a second magnet, the second magnet directionally orientated towards the first side opposite the second side, the second magnet having a second polarity, wherein the first polarity of the outer plate and the second polarity of the inner plate are opposite to ensure an attractive magnetic connection between the first magnet and the second magnet on the inner side and outer side of the article of clothing and wherein a magnetic field of the attachment device is shielded from interference with the personal electronic device.

14. The attachment device as in claim 13, wherein the outer plate second side includes a raised edge, the raised edge extending a perimeter of the second side defining an area.

15. The attachment device as in claim 14, wherein the inner plate is sized for receipt within the area of the outer plate.

16. The attachment device as in claim 13, wherein the inner plate second side includes a textured exterior surface.

17. The attachment device as in claim 16, wherein the textured exterior surface comprises rubber like material.

18. The attachment device as in claim 13, wherein the adhesive is a reusable adhesive.

* * * * *